US012568074B2

(12) United States Patent (10) Patent No.: US 12,568,074 B2

Woo (45) Date of Patent: Mar. 3, 2026

(54) METHOD AND SYSTEM FOR AUTHENTICATION

(71) Applicant: DualAuth Co., Ltd., Seoul (KR)

(72) Inventor: Jong Hyun Woo, Seoul (KR)

(73) Assignee: DualAuth Co., Ltd., Seoul (KR)

( * ) Notice: Subject to any disclaimer, the term of this patent is extended or adjusted under 35 U.S.C. 154(b) by 0 days.

(21) Appl. No.: 15/540,034

(22) PCT Filed: Mar. 28, 2017

(86) PCT No.: PCT/KR2017/003340

§ 371 (c)(1),
(2) Date: Jun. 27, 2017

(87) PCT Pub. No.: WO2017/188610

PCT Pub. Date: Nov. 2, 2017

(65) Prior Publication Data

US 2018/0219851 A1 Aug. 2, 2018

(30) Foreign Application Priority Data

Apr. 25, 2016 (KR) ........................ 10-2016-0049777
Jun. 3, 2016 (KR) ........................ 10-2016-0069790

(51) Int. Cl.
H04L 29/06 (2006.01)
G06F 21/43 (2013.01)
(Continued)

(52) U.S. Cl.
CPC ............ H04L 63/083 (2013.01); G06F 21/43 (2013.01); G06F 21/45 (2013.01); H04L 9/321 (2013.01);
(Continued)

(58) Field of Classification Search
CPC ..... H04L 63/083; H04L 63/123; H04L 9/321; H04L 9/3297; H04L 9/3226;
(Continued)

(56) References Cited

U.S. PATENT DOCUMENTS 7,418,257 B2 * 8/2008 Kim ...................... H04W 12/06
455/406
8,180,686 B2 * 5/2012 Ryu ........................ G06Q 30/00
705/26.81
(Continued)

FOREIGN PATENT DOCUMENTS

WO WO-2004061691 A1 * 7/2004 ............. G06F 21/31
WO WO-2014133300 A1 * 9/2014 ........... H04L 9/3228

*Primary Examiner* — Shawnchoy Rahman
(74) *Attorney, Agent, or Firm* — IP Legal Services, LLC

(57) ABSTRACT

An authentication system performing user-centered authentication may include: an authentication service component acting as an authentication procedure of an online service server; and a mobile authentication agent component acting as the authentication procedure of an access terminal which accesses the online service server. Herein, the authentication service component may confirm a mobile authentication agent component corresponding to user information input from the access terminal as basic authentication information, transmit an authentication password value to each of the confirmed mobile authentication agent component and the online service server which the access terminal intends to access, and transmit an authentication success message to the online service server when a password verification value or an authentication agreement value corresponding to the authentication password value is received from the mobile authentication agent component.

7 Claims, 10 Drawing Sheets

(51) Int. Cl.

| | |
|---|---|
| *G06F 21/45* | (2013.01) |
| *H04L 9/32* | (2006.01) |
| *H04L 9/40* | (2022.01) |
| *H04W 4/14* | (2009.01) |
| *H04W 12/06* | (2021.01) |
| *H04W 12/63* | (2021.01) |

(52) U.S. Cl.

CPC .......... *H04L 9/3226* (2013.01); *H04L 9/3297* (2013.01); *H04L 63/0853* (2013.01); *H04L 63/0876* (2013.01); *H04L 63/123* (2013.01); *H04L 63/18* (2013.01); *H04W 4/14* (2013.01); *H04W 12/06* (2013.01); *H04L 63/0846* (2013.01); *H04L 63/107* (2013.01); *H04L 2209/80* (2013.01); *H04W 12/63* (2021.01)

(58) Field of Classification Search

CPC . H04L 63/0853; H04L 63/18; H04L 63/0876; H04L 63/0846; H04L 2209/80; H04L 63/107; H04W 4/14; H04W 12/06; H04W 12/63; G06F 21/45; G06F 21/43

See application file for complete search history.

(56) References Cited

U.S. PATENT DOCUMENTS

| | | | | |
|---|---|---|---|---|
| 10,299,118 B1* | 5/2019 | Karachiwala | ........... | H04L 67/55 |
| 2003/0233580 A1* | 12/2003 | Keeler | ................ | G06Q 20/382 726/29 |
| 2005/0044197 A1* | 2/2005 | Lai | .......................... | H04L 67/02 709/223 |
| 2005/0177750 A1* | 8/2005 | Gasparini | ............... | G06F 21/31 726/5 |
| 2006/0048184 A1* | 3/2006 | Poslinski | .......... | H04N 21/4542 348/E5.112 |
| 2007/0005730 A1* | 1/2007 | Torvinen | ............. | H04W 12/069 709/219 |
| 2007/0124682 A1* | 5/2007 | Fukeda | ................ | G06Q 10/109 715/730 |
| 2009/0089353 A1* | 4/2009 | Fukuta | .................... | G06F 15/16 709/201 |
| 2009/0249076 A1* | 10/2009 | Reed | ..................... | H04L 9/3228 713/168 |
| 2011/0047608 A1* | 2/2011 | Levenberg | .......... | H04L 63/0807 726/7 |
| 2012/0311684 A1* | 12/2012 | Paulsen | ............. | G06Q 20/4014 726/6 |
| 2013/0333038 A1* | 12/2013 | Chien | ................. | H04L 63/1408 726/23 |
| 2014/0157381 A1* | 6/2014 | Disraeli | ............. | H04L 63/0853 726/7 |
| 2014/0193047 A1* | 7/2014 | Grosz | .................... | G06Q 10/10 382/118 |
| 2014/0245396 A1* | 8/2014 | Oberheide | ............. | G06F 21/40 726/4 |
| 2015/0244706 A1* | 8/2015 | Grajek | ................ | H04L 63/0815 726/6 |
| 2015/0249540 A1* | 9/2015 | Khalil | ..................... | H04L 9/321 713/158 |
| 2016/0241548 A1* | 8/2016 | Kim | .................... | H04L 63/0838 |
| 2016/0266733 A1* | 9/2016 | Alon | ..................... | G06F 3/0484 |
| 2018/0047068 A1* | 2/2018 | Brown | ................... | G06Q 30/02 |
| 2018/0232516 A1* | 8/2018 | Richardson | ............. | G06F 21/45 |

* cited by examiner

[FIG. 1]
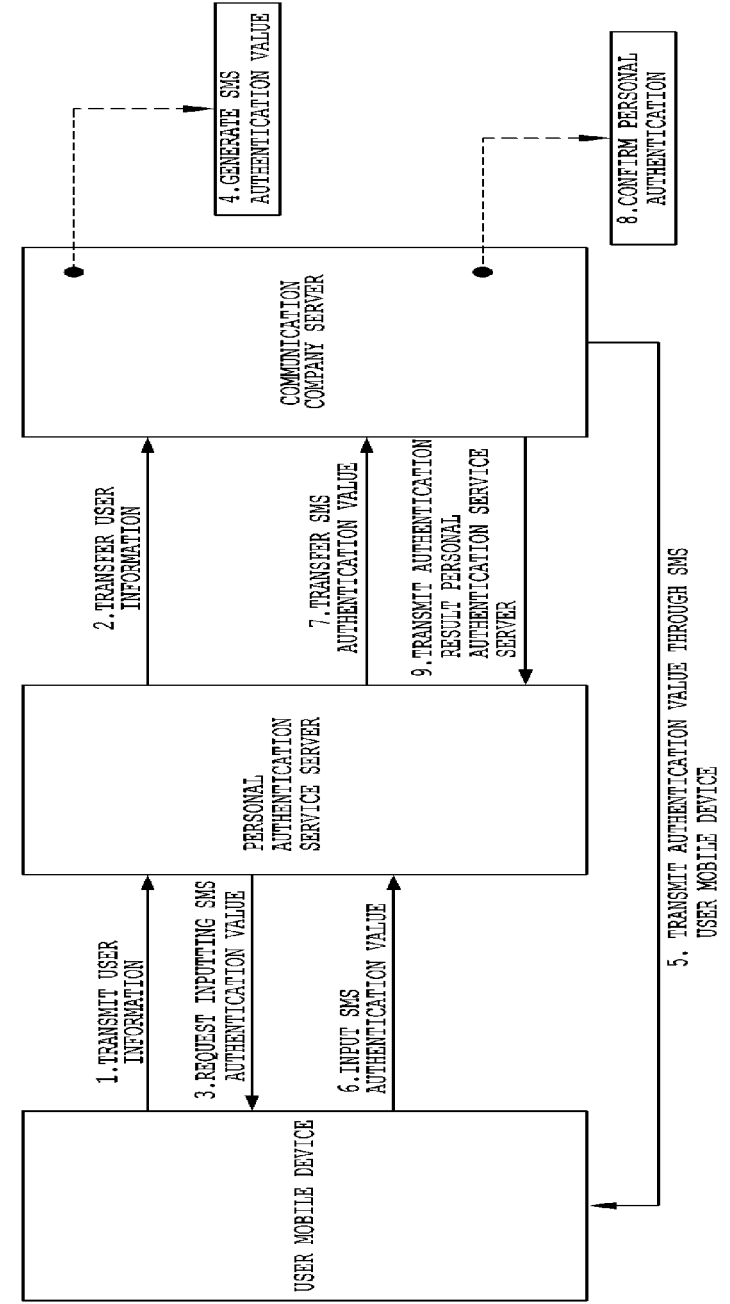

[FIG. 2]
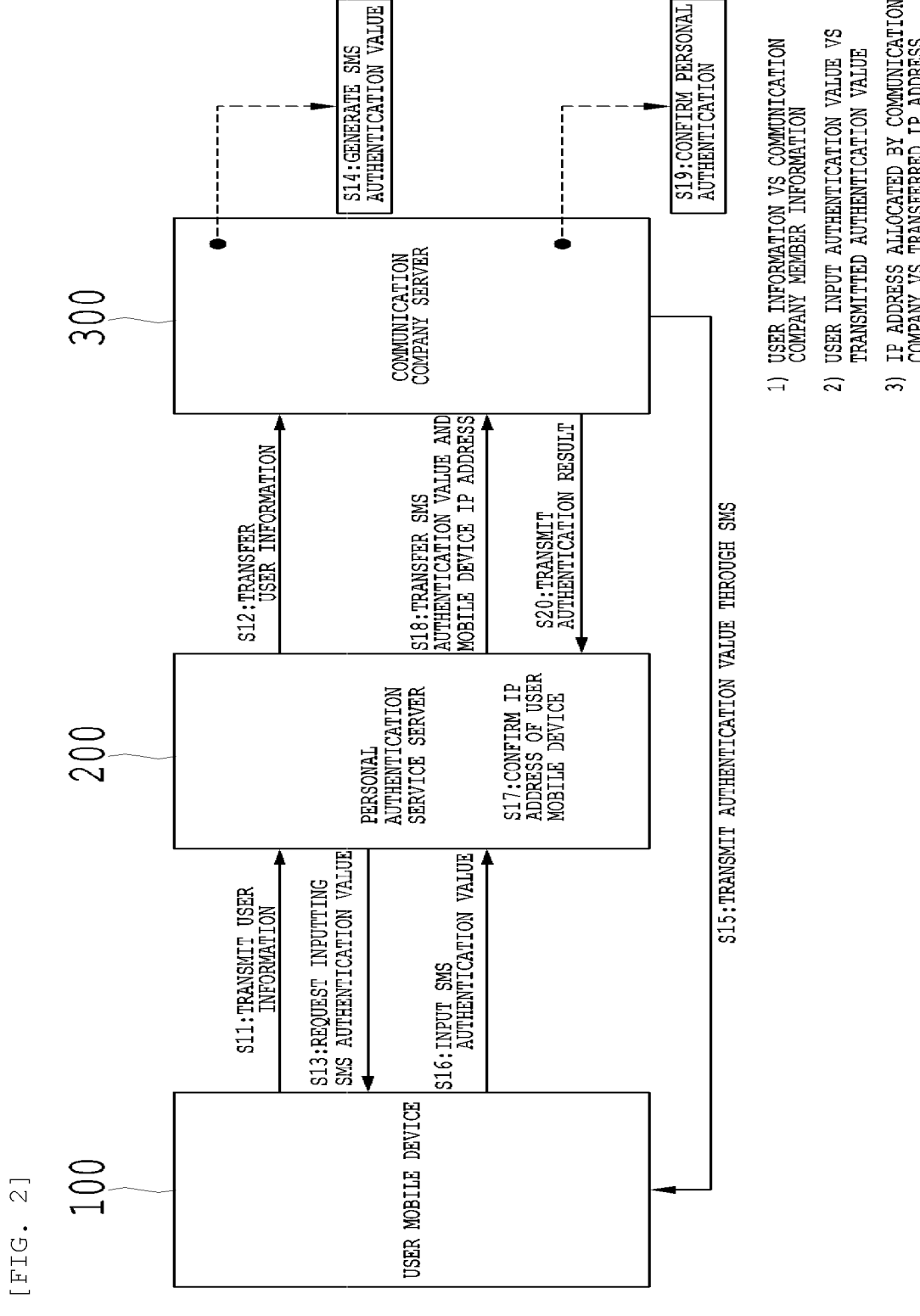

[FIG. 3]
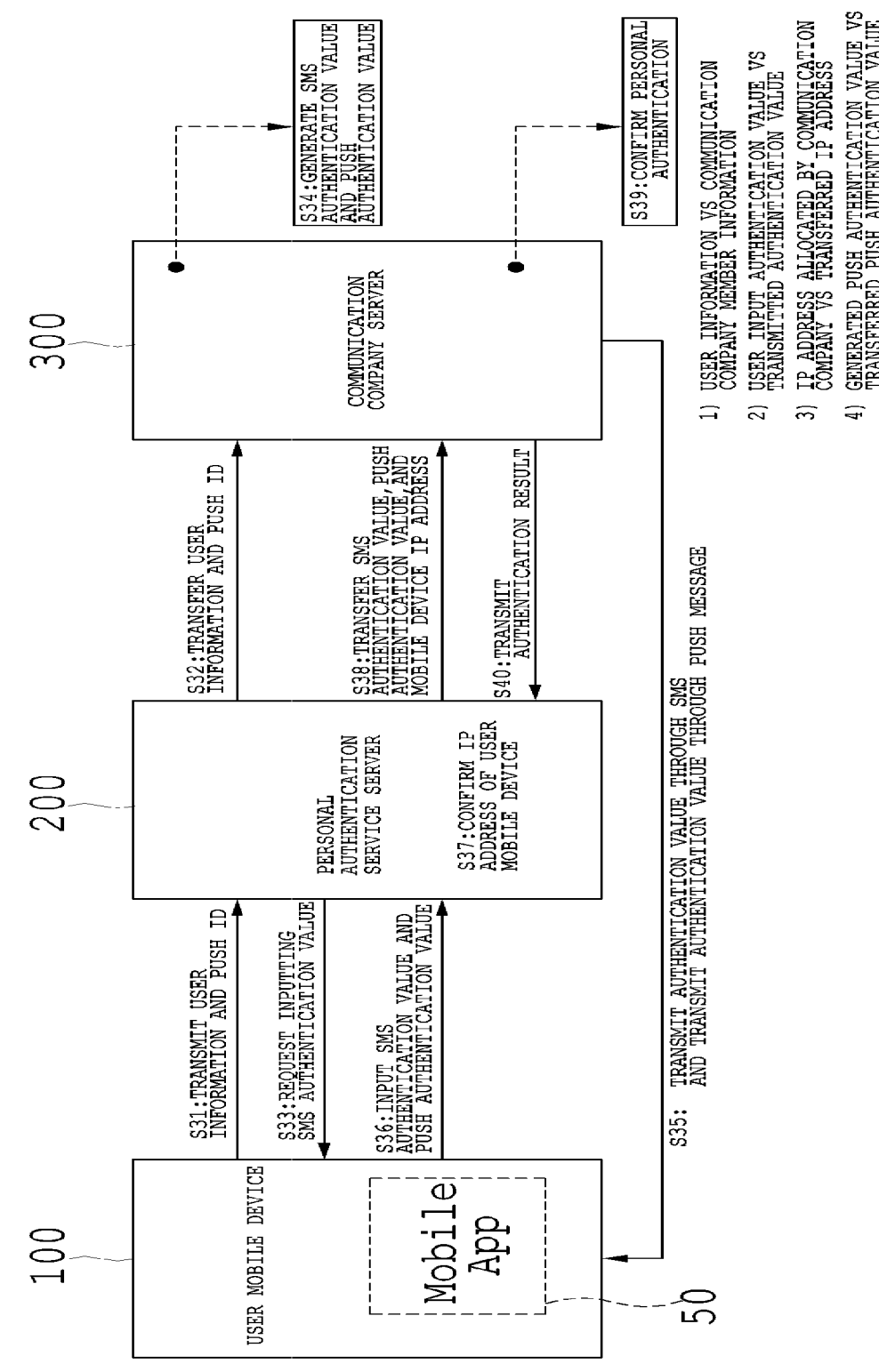

[FIG. 4]
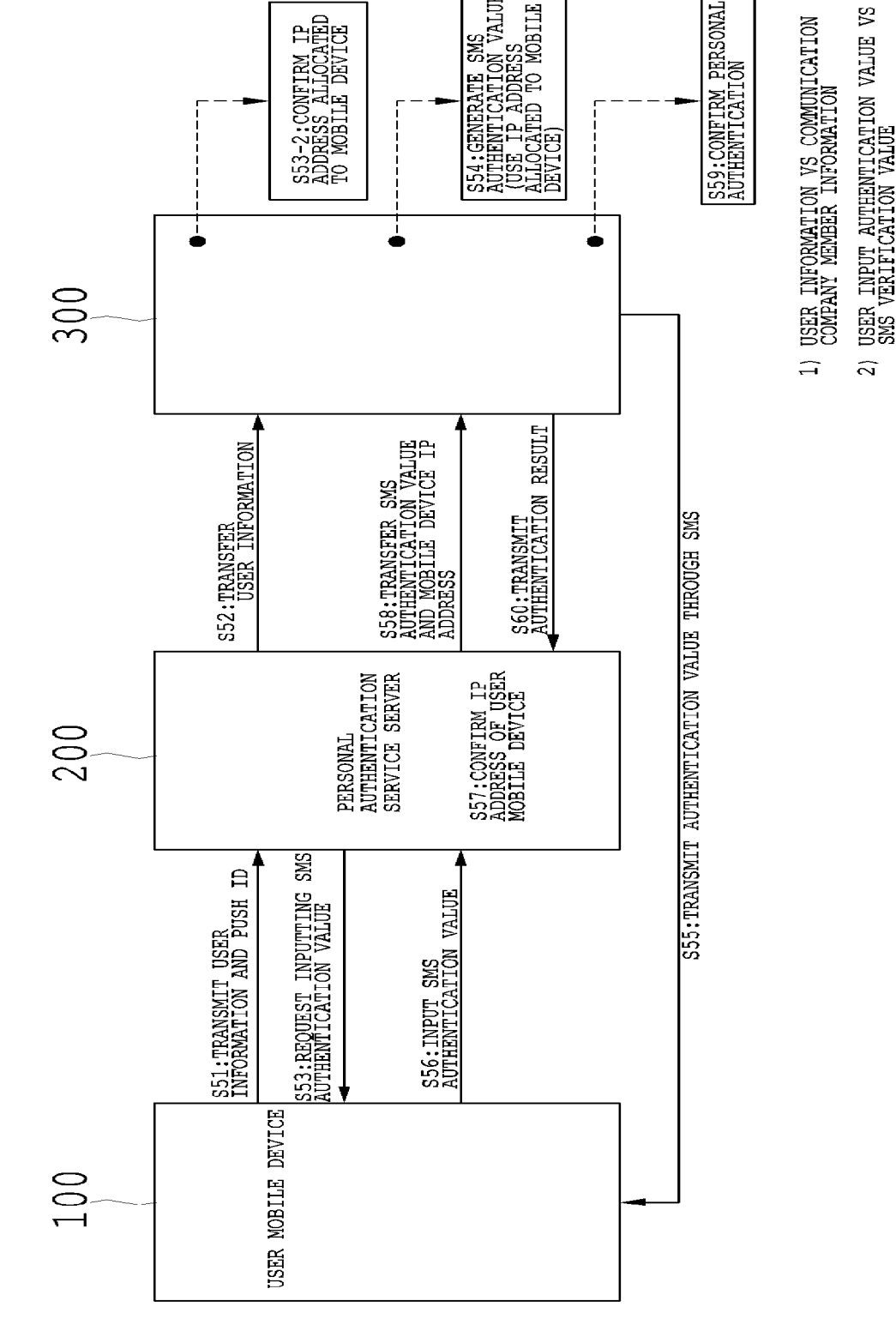

[FIG. 5]
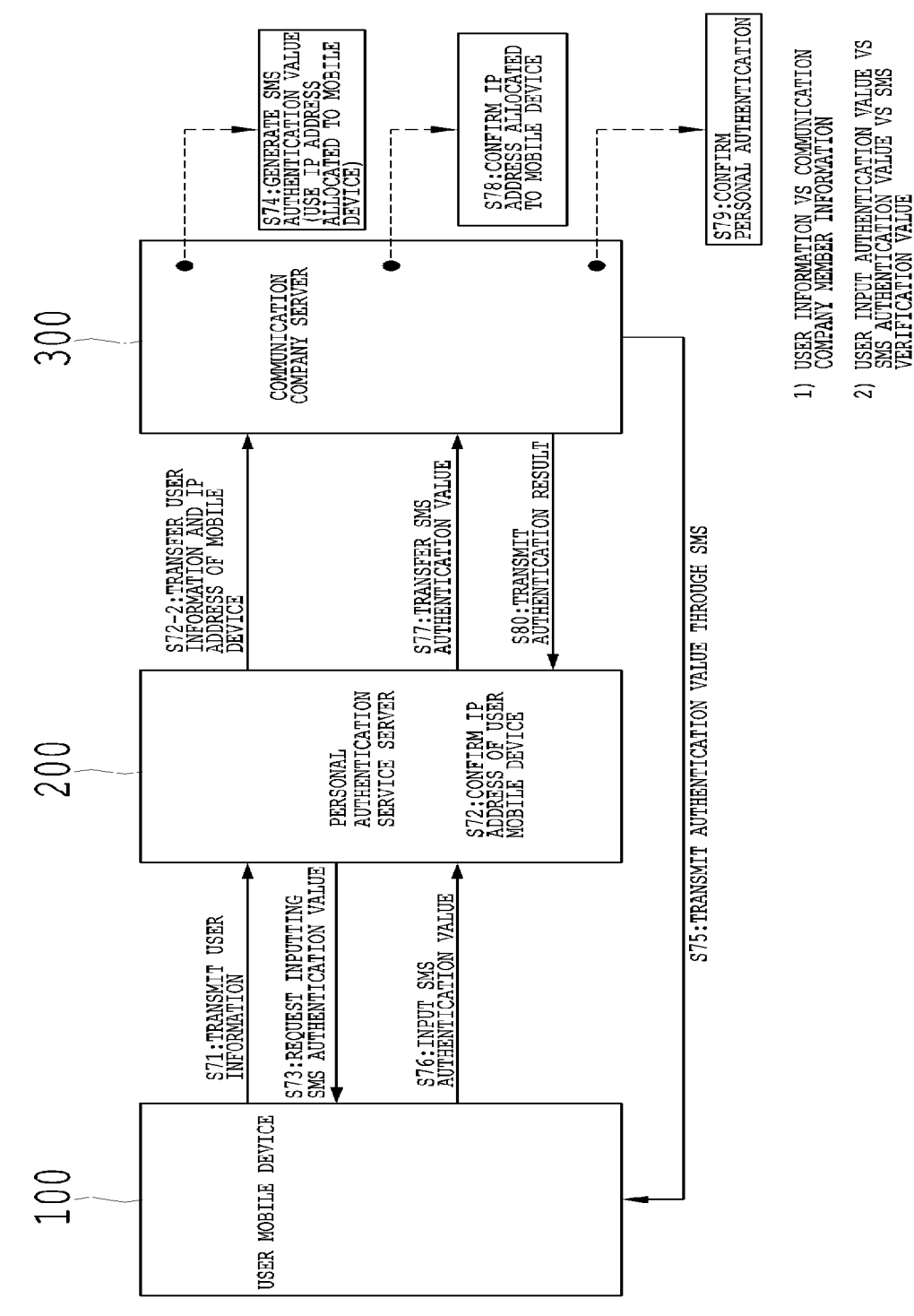

[FIG. 6]
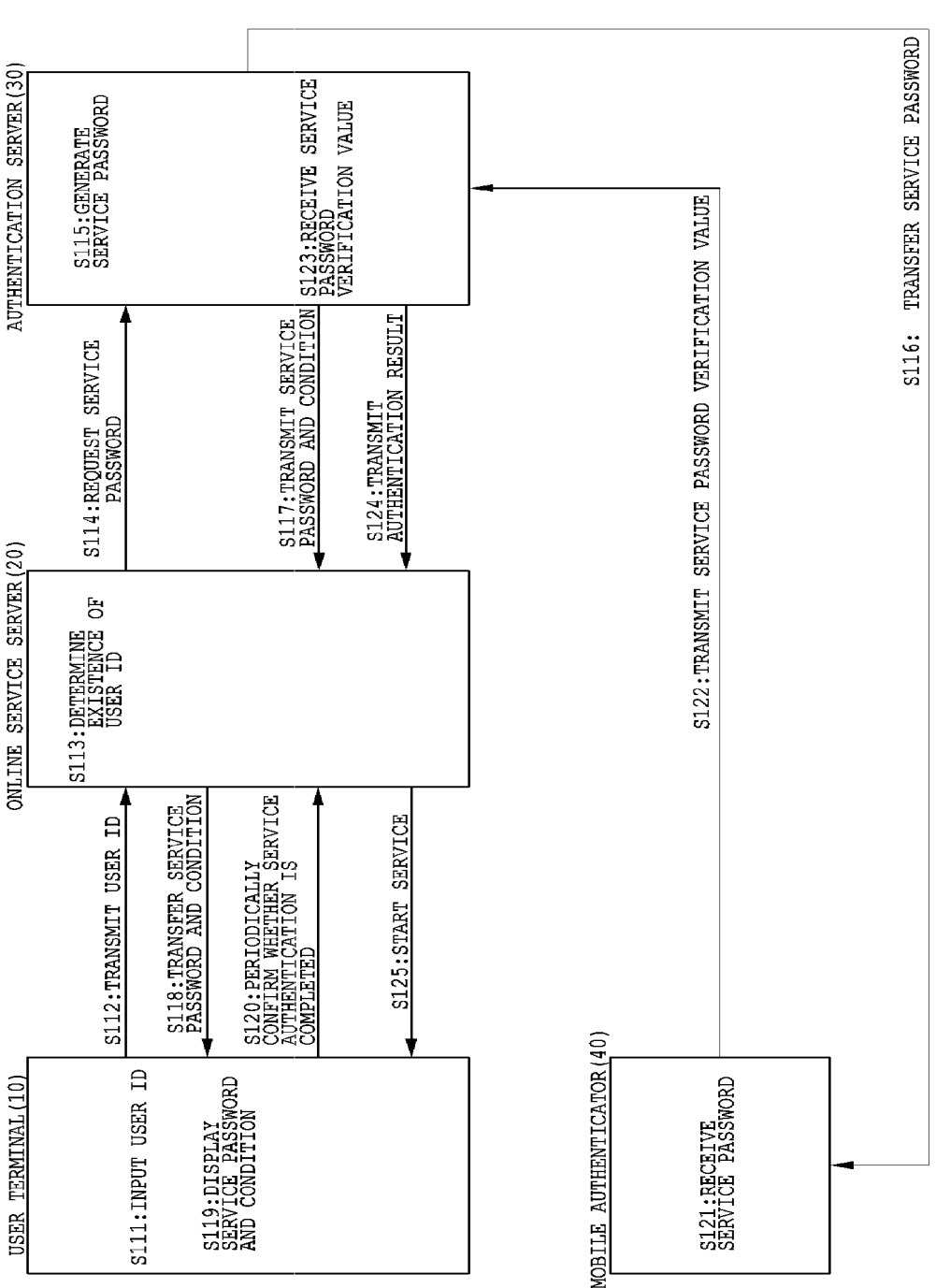

[FIG. 7]
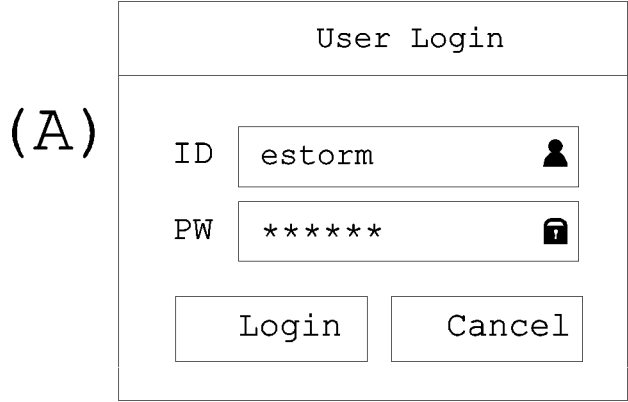
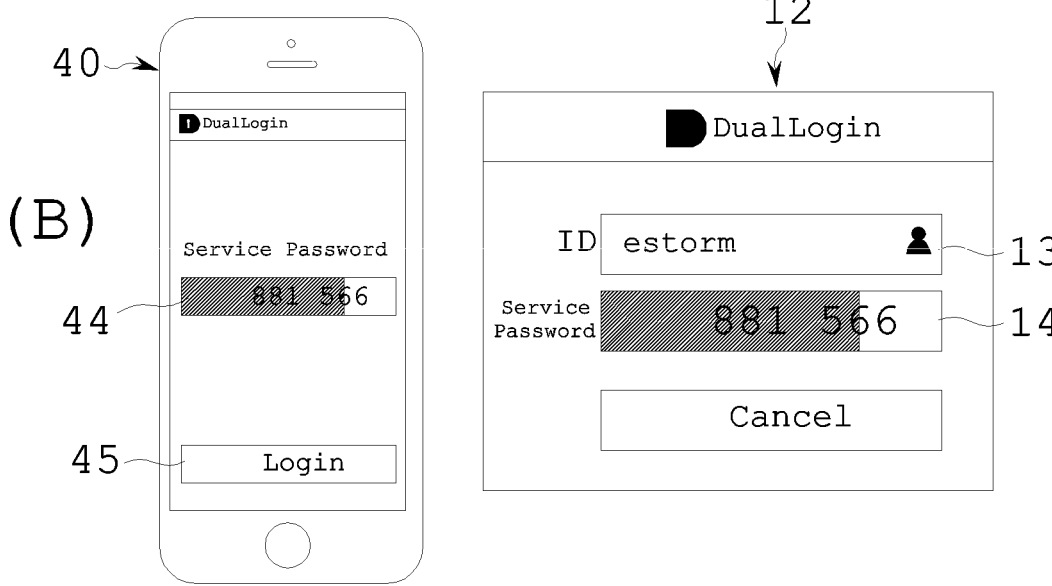

[FIG. 8]

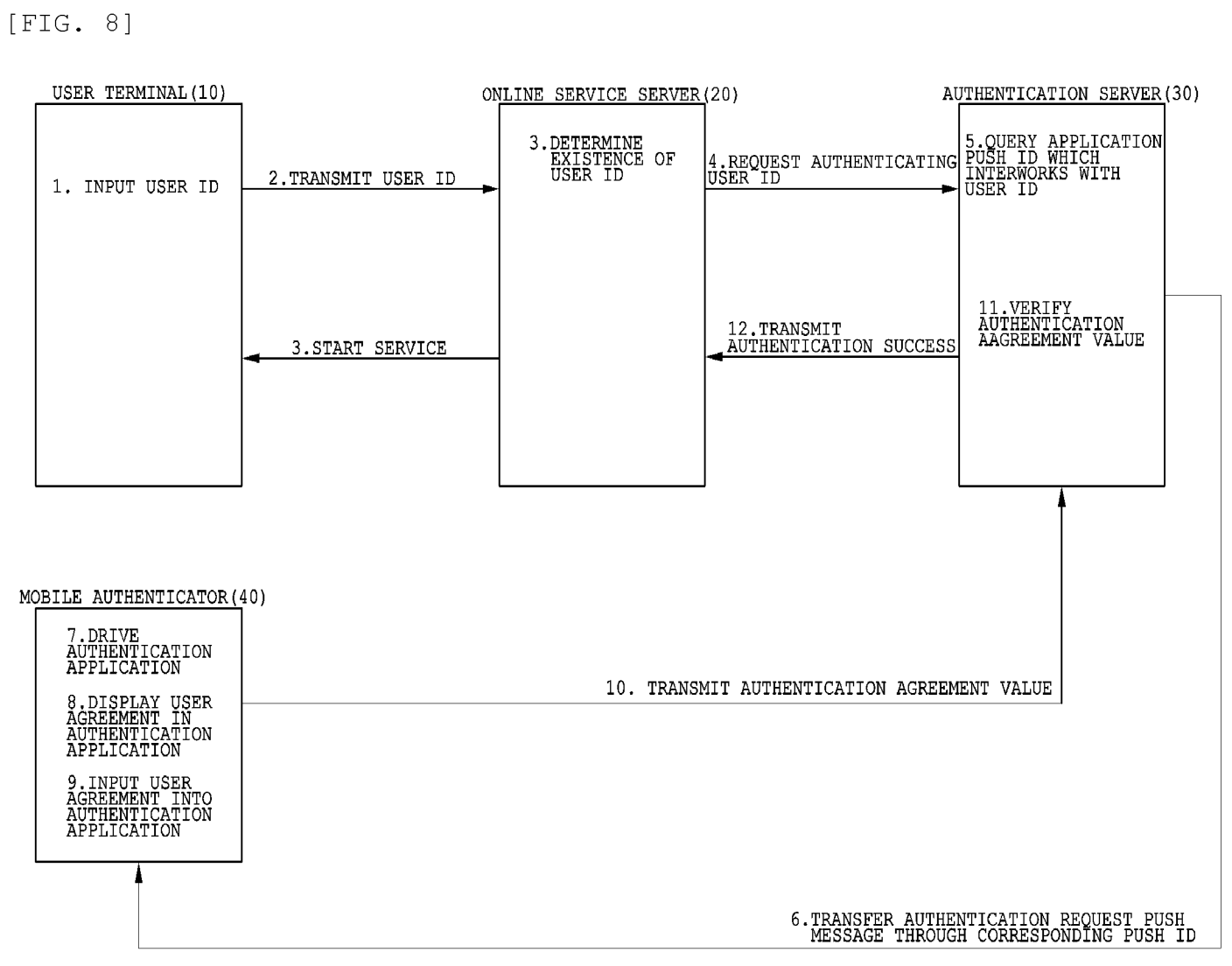

USER TERMINAL(10)

1. INPUT USER ID

2.TRANSMIT USER ID

ONLINE SERVICE SERVER(20)

3.DETERMINE EXISTENCE OF USER ID

3.START SERVICE

4.REQUEST AUTHENTICATING USER ID

12.TRANSMIT AUTHENTICATION SUCCESS

AUTHENTICATION SERVER(30)

5.QUERY APPLICATION PUSH ID WHICH INTERWORKS WITH USER ID

11.VERIFY AUTHENTICATION AAGREEMENT VALUE

6.TRANSFER AUTHENTICATION REQUEST PUSH MESSAGE THROUGH CORRESPONDING PUSH ID

10. TRANSMIT AUTHENTICATION AGREEMENT VALUE

MOBILE AUTHENTICATOR(40)

7.DRIVE AUTHENTICATION APPLICATION

8.DISPLAY USER AGREEMENT IN AUTHENTICATION APPLICATION

9.INPUT USER AGREEMENT INTO AUTHENTICATION APPLICATION

[FIG. 9]
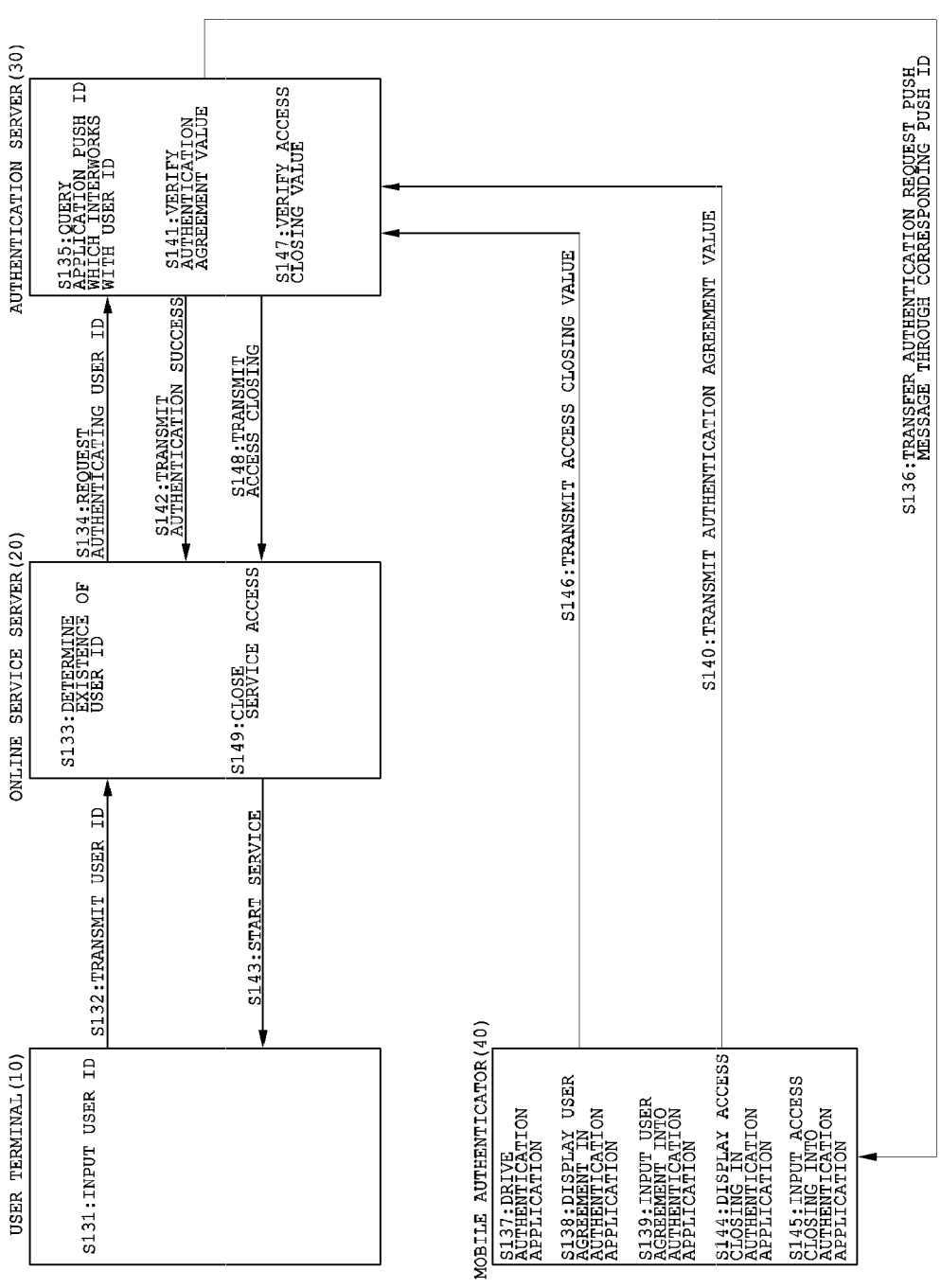

[FIG. 10]
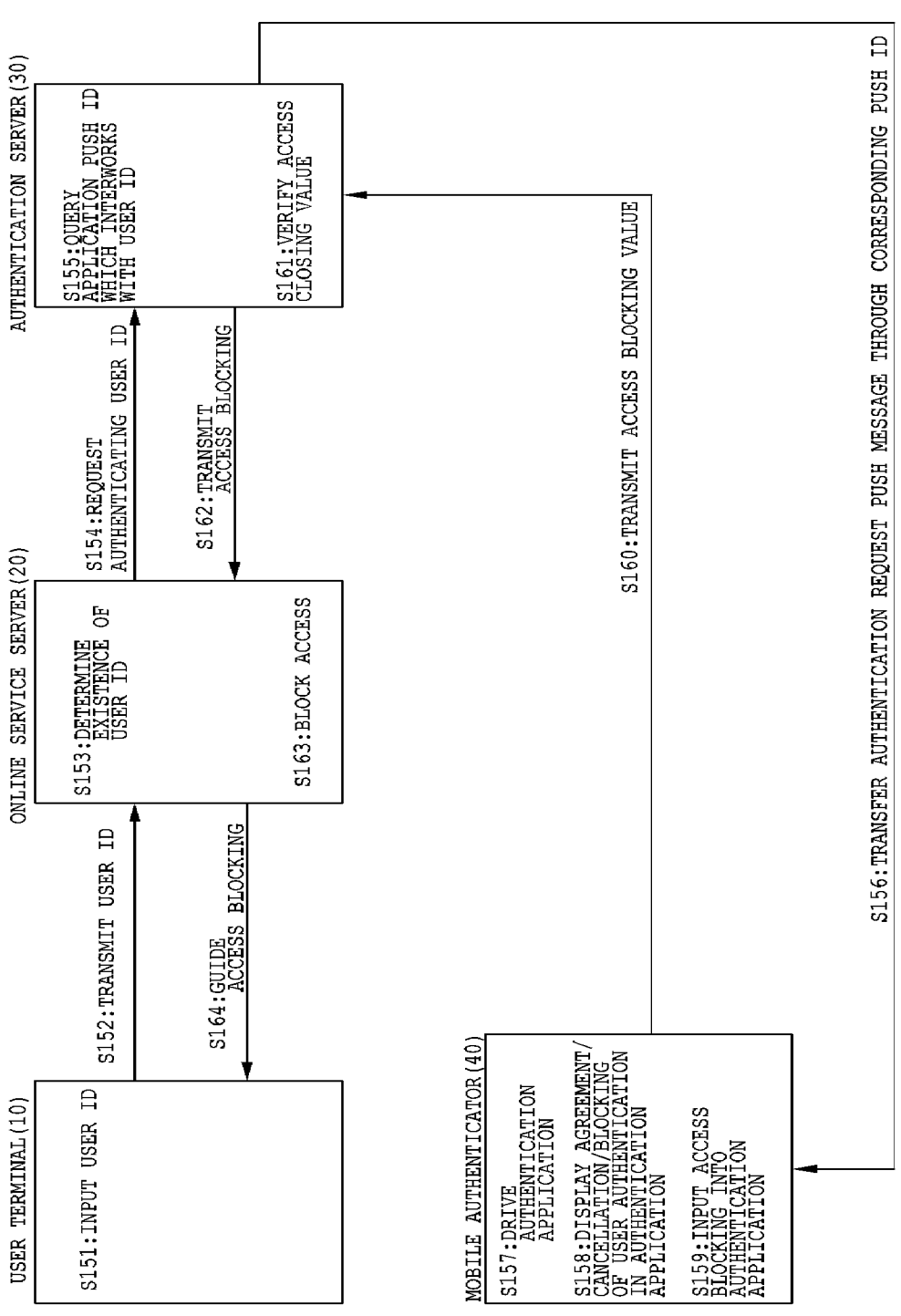

METHOD AND SYSTEM FOR AUTHENTICATION

CROSS REFERENCE TO PRIOR APPLICATIONS

This application is a National Stage Application of PCT International Patent Application No. PCT/KR2017/003340 filed on Mar. 28, 2017, under 35 U.S.C. § 371, which claims priority to Korean Patent Application Nos. 10-2016-0049777 filed on Apr. 25, 2016, and 10-2016-0069790 filed on Jun. 3, 2016 which are all hereby incorporated by reference in their entirety.

TECHNICAL FIELD

The preset invention relates to a method and a system for authentication associated with user authentication or/and service authentication.

BACKGROUND ART

The importance of user authentication has increased day by day in access processes to various web sites, mobile apps, financial or payment services, and like. Further, in recent years, the concept of service authentication has also been introduced in accordance with the need to confirm that a corresponding service site is not a false site as risks including phishing, and the like have increased.

First, a method which is most commonly used in order to authenticate a user is a method of an ID and a password of the user. However, the scheme of utilizing the ID and the password of the user has a problem that security is not high because corresponding information is not easily leaked or taken.

Therefore, in recent years, as a scheme of utilizing a short message service (SMS), a personal authentication service or a device possession authentication service using the SMS has been widely used in order to confirm the user (that is, confirm a service user) or confirm device possession in an online web or a mobile app (App) service.

Typically, the personal authentication service using the SMS as a real name confirmation service for comparing user information (e.g., a name, a resident registration number, a phone number, etc.) input from the user and member information registered in a communication company is a personal authentication service which simultaneously confirms both input user information and whether the corresponding user possesses a mobile phone when a transmitted authentication value and an input authentication value coincide with each other by transmitting an SMS authentication value to a mobile phone number input through a wireless communication network and inputting the corresponding authentication value in an authentication window within a predetermined valid time by a corresponding mobile phone user (see FIG. 1).

Further, in order to confirm whether the mobile phone number which a service system receives from the user by a service system is correct regardless of the service member DB regardless of a communication company member DB, the mobile phone possession authentication service using the SMS is a device possession authentication service that confirms whether the corresponding user possesses the mobile phone when the transmitted authentication value and the input authentication value coincide with each other by transmitting the SMS authentication value to the mobile phone number input through the wireless communication network and inputting the authentication value in the authentication window within the valid time by the corresponding mobile phone user.

However, due to frequent accidents by hackers impersonating users through the authentication service using the SMS, the authentication service using the SMS is no longer a reliable authentication means. The main reason for easily hacking SMS authentication is that personal information (e.g., the name, the phone number, the resident registration number, an e-mail, etc.) used in an SMS authentication service is already exposed to the hackers due to a large personal information leakage accident and further, the SMS or the e-mail is transmitted, which guides malware installation through the targeted mobile phone number or e-mail account and the hackers may intercept the SMS input in a corresponding mobile phone when the user installs a malicious code or malware.

Therefore, anew SMS based authentication technology is required, which allows the corresponding SMS authentication value to be verified only in the mobile phone of the user even though the SMS sent to the mobile phone of the user is taken by the hackers.

As dozens of online services are utilized, password management becomes more difficult for the user. If the user uses one simple password which the user easily remembers for convenient password management, the security of all services becomes unstable and on the contrary, if the user uses various passwords for each service, it becomes difficult to remember the passwords. Further, if the password needs to be periodically changed according to a security policy, a burden of the password by the user is weighted.

Further, in the case of OTP dongle or a mobile access approval app which is introduced to improve the security and the password management burden, the security and convenience increase while performing the user authentication through a device possessed by the user, but if an initially accessed service is a hacking service which pretends an actual service, the user may not know whether the accessed service is authentic, and as a result, the user may prevent a pharming attack.

In this case, an authentication concept of computerized service itself as a problem caused by a service-oriented authentication technology in which the user presents the authentication information and the server judges the presented authentication information is a problem which may not be solved when the user meets a false service impersonating an authentic service.

Therefore, since the existing service-oriented user authentication technology is not only burdensome for the user to manage the passwords but also causes cost, and is vulnerable to a password guessing attack or a man-in-the-middle attack, a new concept authentication technology (that is, a user-oriented authentication technology) capable of overcoming such a limit is required.

In another aspect, an authentication technology has been spreading to confirm whether the user is a normal user through a smart phone possessed by the user, with activation of kill password movement to allow the user to authenticate the user without memorizing the password of the online service.

Referring to a representative operation flow (see FIG. 8) of the related art, when the user accesses an online service using an online access terminal and inputs the ID, the push service transmits a push message to the mobile authentication application which the user registers in advance in the online service. Whether the access is permitted to the user is displayed in the mobile authentication application receiving the push message and when the user inputs an agreement for the service access, the mobile authentication application transmits an authentication value to confirm the user authentication to the online service. As a result, log-in to the online service associated with the access terminal is permitted.

However, when the user attempts to access the service by using the terminal, in the case where the user accesses the pharming service which operates to take the user access unlike an intention of the user and inputs the ID, the corresponding ID is provided to the hackers. Therefore, when the ID secured at the corresponding time is input by accessing a normal service by using the terminal of the hacker, a normal authentication request push message is transferred to the user. At this time, the user misunderstands the authentication based on the access of the user, and when the mobile authentication application approves the access, a situation occurs, in which the access of the hacker is consented.

Further, since the ID of the user is frequently registered in the same character string in various services and is used publicly, in the case where a hacker who secures the ID inputs the ID into the online service, whenever the hacker attempts authentication with the smart phone of the user of the corresponding ID, the user needs to frequently receive unnecessary authentication requests for authentication from time to time. Further, in an authentication request selection process, when the user permits the access due to an immature operation, the hacker accesses the service.

In addition, even in a service authentication technology, in which the service provides a service password to a user after the user inputs the ID and the user selects whether the user accesses the service by verifying the service password with a service password verifier mobile application, the user does not often explicitly confirm the password presented by the service and the password presented by the mobile application. When the user only looks at a pattern with a similar design and grants unconditional access to a mobile service password generator application, the user accesses a pharming site pretending to be a real service and permits the hacker to access the device of the user.

Therefore, when the authentication is performed with the existing ID and the existing smart device, the hacker is permitted to access the device of the user in the case where the user is caught in a middle-man attack which pretends to be the service or the immature operation is performed due to frequent authentication requests, and as a result, a new technology is required, which is capable of overcoming the middle-main attack or the access by the hacker.

DISCLOSURE

Technical Problem

In order to solve the problems, according to a first aspect of the present invention, a method and a system for a user authentication service are provided, which makes an SMS authentication value be valid only in a corresponding mobile phone as a user authentication service that authenticates that a mobile phone user is a user by using access information of a corresponding user mobile phone accessing a personal confirmation service and the SMS authentication value received by the mobile phone in providing a personal authentication service using an SMS.

According to a second aspect of the present invention, a method and a system for user-centered service authentication are provided, which does not verify use password information based on a service but verify a service password based on a user and authenticate the user in authenticating the user in order to use an online service.

According to a third aspect of the present invention, a method and a system which may allow a user to interrupt a service in a terminal that accesses a current service after agreeing with authenticating even though the user permits the authentication in a mobile device due to a trickery or a mistake of the user when not an authentication request according to a user's own request but the authentication request by a hacker is input into the mobile device of the corresponding user or allow the user to interrupt the access in advance when a user ID is input into the corresponding service by the hacker and the authentication request is thus received into a service server in the online service that provides user authentication using an ID of the user and the mobile device of the user in order to provide a convenient online service without a password.

Technical Solution

According to an aspect of the present invention, disclosed is an authentication service system performing user authentication by using a short message service (SMS), including: an authentication service component; and a verification component.

The authentication service component t transfers use information received as basic authentication information to the verification component, confirms an IP address which is access information of a mobile device accessed for the user authentication, and transfers the confirmed IP address of the mobile device and an SMS authentication value input from the mobile device to the verification component.

The verification component generates the SMS authentication value to be used for authenticating the corresponding user to correspond to the transferred user information and transmits the generated SMS authentication value to a registered mobile device corresponding to the corresponding user information, confirms the IP address which a communication company allocates to the registered mobile device, and verifying whether the user authentication is appropriate according to whether the SMS authentication value transferred from the authentication service component and the generated SMS authentication value coincide with each other and whether the IP address transferred from the authentication service component and the confirmed IP address allocated by the communication company coincide with each other.

In an embodiment, the SMS authentication value may be an authentication value generated by using all or some of the IP addresses which the communication company allocates to the registered mobile device as a seed value.

In an embodiment, when the user authentication is executed through a mobile application installed in the mobile device of the corresponding user, the authentication service component may receive a push ID of the mobile application and transfer the received push ID to the verification component. Further, the verification component may generate a push authentication value, transmits the push authentication value by referring to the push ID to the mobile application by means of a push message, and use the push authentication value as an additional authentication element of a user authentication process.

In an embodiment, the authentication service component may transfer the push authentication value received from the accessed mobile device to the verification component. Further, the verification component may use whether the push authentication value transferred from the authentication service component and the generated push authentication value additionally coincide with each other for verifying whether the user authentication is appropriate.

In an embodiment, when the mobile device accessed for the user authentication and the registered mobile device receiving the SMS authentication value are different from each other, the verification component may compare positional information acquired to correspond to the IP address of the accessed mobile device and positional information acquired to correspond to current GPS information of the registered mobile device with each other to verify whether the user authentication is appropriate according to whether the mobile devices are within a previously designated position range.

In an embodiment, the authentication service component may be implement in a service server associated with a service which user intends to acc ess or an authentication agent server that acts as an authentication procedure of the corresponding service server, and the verification component may be implemented in a communication company server or the authentication agent server.

According to another aspect of the present invention, an authentication system performing user-centered authentication may include: an authentication service component acting as an authentication procedure of an online service server; and a mobile authentication agent component acting as the authentication procedure of an access terminal which accesses the online service server.

Herein, the authentication service component may confirm a mobile authentication agent component corresponding to user information input from the access terminal as basic authentication information, transmit an authentication password value to each of the confirmed mobile authentication agent component and the online service server which the access terminal intends to access, and transmit an authentication success message to the online service server when a password verification value or an authentication agreement value corresponding to the authentication password value is received from the mobile authentication agent component.

In an embodiment, the authentication service component may additionally transmit password valid time information regarding the authentication password value to the online service server.

In this case, the online service server may allow a graphical user interface (GUI) allowing the authentication password value and the password valid time to be displayed together through an authentication password display window to be displayed on a screen of the access terminal.

In an embodiment, the authentication service component may additionally transmit the password valid time information regarding the authentication password value to the mobile authentication agent component.

In this case, the mobile authentication agent component may allow the graphical user r interface (GUI) allowing the authentication password value and the password valid time to be displayed together through the authentication password display window to be displayed on the screen of an authenticator.

In an embodiment, the authentication password value may be displayed in the authentication password display window by a number string or a character string and the password valid time may be displayed in the authentication password display window in a time lapse bar shape to visually guide the lapse of a password valid time.

In an embodiment, the authentication service component may update and generate the authentication password value with the lapse of the password valid time and retransmit the updated and generated authentication pass word value to the online service server and the mobile authentication agent component. In this case, the authentication password value and the password valid time may be updated and displayed in the authentication password display window with the update of the authentication password value.

In an embodiment, after service use is permitted to the online service server in association with the access terminal with the transmission of the authentication success message, when an access closing value is received from the mobile authentication agent component to the authentication service component, the authentication service component may confirm whether a transmission subject of the access closing value is the registered mobile authentication agent component corresponding to a service user and transmit an access closing request message to the online service server when it is confirmed that the access closing value is received from the registered mobile authentication agent component.

In an embodiment, when an access blocking value is received from the mobile authentication agent component receiving the authentication password value to the authentication service component, the authentication service component may confirm whether the transmission subject of the access blocking value is the registered mobile authentication agent component corresponding to the service user and transmit an access blocking request message to the online service server when it is confirmed when the access blocking value is received from the registered mobile authentication agent component.

In an embodiment, the authentication service component may keep related information regarding the access terminal in which the access is blocked and automatically block an authentication request when the authentication request of the same condition is reattempted from the access terminal in which the access is blocked.

Advantageous Effects

According to a first aspect of the present invention, since only a legitimate user may use a personal authentication service by using an SMS even though an SMS authentication value is take by a hacker, a user authentication service becomes valid, which is reliable in a fin-tech service, an IoT service, various online services, and the like.

According to a second aspect of the present invention, a user need not know or periodically change or input a password in using the online service and the service is authenticated by verifying whether the password provided by the service and the password displayed in a service password verifier coincide with each other, and as a result, only a legitimate use possessing the service password verifier may use the service. Moreover, since the user may explicitly discriminate even that a service which the user first accesses is a pharming service through a service password, a limit of a mobile based access approval application technology which is vulnerable to a hacking accident by the existing middle-main attack may also be overcome.

Further, according to a third aspect of the present invention, in performing the user authentication using a service ID and a mobile app for authentication while the user uses the online service, the user may arbitrarily cancel the existing approved access even though the user is caught with a pharming attack impersonating the service, the user approves the access without confirming the access of the hacker due to careless use, or an operation mistake is made to approve the access when frequent authentication requests are received in the mobile authentication application, and as a result, it is possible to secure the user authentication so that only the legitimate user possessing a legitimate verifier uses the service. In particular, even when the user becomes familiar with the process of performing the user authentication only with the user ID and the mobile authentication application and a habit of the user is fixed due to long-term use, it is possible to greatly secure the habit of the user authentication without any judgment. In addition, when the mobile authentication application blocks the access according to the authentication request even though the ID of the user is exposed to the hacker, a service server blocks the corresponding ID or the ID and an IP address so as to prevent an attacker to access the service with the corresponding ID any longer, and as a result, it possible to overcome the limitations of the existing authentication technology which consists of only the ID and an authenticator application.

DESCRIPTION OF DRAWINGS

FIG. 1 is a diagram illustrating a personal authentication service using an SMS in the related art.

FIGS. 2 to 5 are diagrams for describing a method and a system for a personal authentication service using an IP address and an SMS according to an embodiment of the present invention.

FIG. 6 is a diagram illustrating a flow of a user centered service authentication technology according to an embodiment of the present invention.

FIG. 7 is a diagram illustrating an embodiment regarding service centered user authentication in the related art and an embodiment regarding user centered service authentication according to the embodiment of the present invention.

FIG. 8 is a diagram illustrating the flow of user authentication in the related art using an ID and a mobile device of a user without a service password of the user.

FIG. 9 is a diagram of authenticating an user and thereafter, canceling service access of the corresponding user in a system that authenticates the user by using the ID and the mobile device of the user without a service password of the user.

FIG. 10 is a diagram illustrating the flow of blocking an attempt when a malicious user attempts authentication with the ID of the user in the system that authenticates the user by using the ID and the mobile device of the user without the service password of the user.

MODE FOR INVENTION

The present invention may have various modifications and various embodiments and specific embodiments will be illustrated in the drawings and described in detail in the detailed description. However, this does not limit the present invention within specific embodiments, and it should be understood that the present invention covers all the modifications, equivalents and replacements within the idea and technical scope of the present invention. In describing the present invention, a detailed description of related known technologies will be omitted if it is determined that they unnecessarily make the gist of the present invention unclear. In addition, numeral figures (for example, 1, 2, and the like) used during describing the specification are just identification symbols for distinguishing one element from another element.

Further, throughout the specification, if it is described that one component is "connected" or "accesses" the other component, it is understood that the one component may be directly connected to or may directly access the other component but unless explicitly described to the contrary, another component may be "connected" or "access" between the components.

Moreover, throughout the specification, unless explicitly described to the contrary, the word "comprise" and variations such as "comprises" or "comprising", will be understood to imply the inclusion of stated elements but not the exclusion of any other elements. Further, terms including "unit", "module", and the like disclosed in the specification mean a unit that processes at least one function or operation and this may be implemented by one or more hardware or software or a combination of hardware and software. Further, Push ID expressed by general mobile application developers means Push Token and a push message service means a message service provided for each application in a mobile operating system such as Google or Apple.

Hereinafter, embodiments of the present invention will be described in detail with reference to the accompanying drawings. Herein, FIGS. 2 to 5 are diagrams for describing a method and a system for a personal authentication service using an IP address and an SMS according to an embodiment of the present invention. That is, FIGS. 2 to 5 illustrate an authentication service method when a user performs various personal authentications (e.g., personal authentication for accessing a website, personal authentication for final transaction or payment through online/mobile, and the like) by using a mobile device possessed thereby.

In FIGS. 2 to 5, a case where a mobile phone (particularly, smart phone) is used as a 'user mobile device 100' primarily described, but it is first clarified that various devices may be used as the user mobile device in addition to the mobile phone. Further, 'personal authentication service server 200' of FIGS. 2 to 5 may a e separate server that acts as only an authentication service, but may be implemented while being integrated in a server for another purpose. For example, operations and roles of respective steps which will be performed in the personal authentication service server 200 may be implemented as some functions in a target server which the user intends to actually access. Further, in FIGS. 2 to 5, it is illustrated that a final confirmation (alternatively, verification) procedure of personal authentication is performed in a communication company server 300, but this not particularly required. That is to say, the final confirmation (alternatively, verification) procedure (see S19 of FIG. 2, S39 of FIG. 3, S59 of FIG. 4, and S79 of FIG. 7) of the personal authentication may be performed in an external verification server which exists separately from the personal authentication service server or the personal authentication service server may integratedly perform even a corresponding function. That is, as a system design scheme, various modified examples may exist, and as a result, the present invention may also be variously modified in a shape appropriate to a designed system.

Further, it is clarified that reference numerals (that is, S11, S12, S13, etc.) associated with respective steps in the personal authentication procedures of FIGS. 2 to 5 to be described below are just used for distinguishing describing the respective steps and do not define a procedural order. Logically, if other steps may be executed only after any one step is executed, the respective steps may be executed in parallel or simultaneously regardless of the order of the reference numerals, of course. In some cases, it is apparent that the respective steps may be executed in an order different from the order of the reference numerals. Only when a core technical feature of the present invention may be sufficiently reflected, the order of the respective steps may also be variously modified. However, hereinafter, for intensive and easy description, the respective steps will be described according to the order illustrated in the drawing.

Hereinafter, the personal authentication procedure of FIG. 2 will be described.

Referring to the personal authentication procedure of FIG. 2, as user information is transmitted from a user mobile device 100 to a personal authentication service server 200 [see S11 of FIG. 2], the personal authentication service server 200 transfers the user information received from the user mobile device 100 to a communication company server 300 [see S12 of FIG. 2].

In this case, usable user information is not particularly limited and all information including various personal information, unique information, device information, and the like which may be used as basic information which enables user identification may be used. Examples of the user information include a name, a resident registration number, a date and birth, a phone number, a USIM number, a user ID, and the like (this is also applied even to FIGS. 3 to 5).

The aforementioned user information may be input directly by the corresponding user (e.g., directly input through a web browser or a mobile application of a smart phone, etc.) or automatically input in an initial authentication step. For example, when the user executes a specific application installed in the smart phone thereof, pre-designated information may be implemented to be automatically input as the user information simultaneously with the execution.

After the user information is input as described above, the personal authentication service server 200 requests inputting a short message service (SMS) authentication value [see S13 of FIG. 2]. As a result, an authentication window for inputting the SMS authentication value may be displayed on a screen of the user mobile device 100. Henceforth, the SMS authentication value is input into the corresponding authentication window, and as a result, security authentication will be requested [see S16 of FIG. 2].

In this case, the SMS authentication value is generated by the communication company server 300 [see S14 of FIG. 2]. That is, when the user information is transferred according to S14 of FIG. 2, the communication company server 300 generates an authentication value constituted by a predetermined variable value and thereafter, confirms a smart phone number corresponding to the user information received based on a member DB and transmits the authentication value to the smart phone through the SMS [see S15 of FIG. 2]. Further, in this case, according to a design scheme of the communication company server 300, a public or/and private IP address which a communication company allocates to the corresponding smart phone number may be previously confirmed.

When the user inputs the SMS authentication value transmitted from the communication company server 300 [see S16 of FIG. 2], the personal authentication service server 200 confirms access information (I this example, the public IP or/and private IP address, hereinafter, briefly referred to as the IP address) of the user mobile device which accesses the service [see S17 of FIG. 2] and transfers the input SMS authentication value and the confirmed IP address of the corresponding mobile device to the communication server 300 [see S18 of FIG. 2].

In this case, methods for determining the access information of a connected client (in this example, the user mobile device 100) include various methods, but as one example, a web server may determine a public IP and a private IP of a connected client terminal by using a server variable.

When the SMS authentication value and the IP address of the mobile device are transferred, the communication personal authentication company server 300 performs confirmation according to S19 of FIG. 2. This may be performed by the following method. First, it is compared whether the user information transferred in S12 of FIG. 2 and member information of the communication company member DB coincide with each other, second, it is compared whether the SMS authentication value (that is, the SMS authentication value input by the user) transferred according to S18 of FIG. 2 and the SMS authentication value (that is, the SMS authentication value transmitted to the user according to S15 of FIG. 2, hereinafter, referred to as an SMS verification value) generated according to S14 of FIG. 2 coincide with each other, and third, it is compared whether the IP address of the mobile device transferred according to S18 of FIG. 2 and the IP address of the mobile device which the communication company confirms in itself (that is, the communication company allocates to the corresponding mobile device) coincide with each other to perform the personal authentication confirmation.

When the personal authentication confirmation process is completed, the communication company server 300 transmits a personal authentication result (that is, success or failure) to the personal authentication service server 200 [see S20 of FIG. 2]. The personal authentication service server 200 determines personal authentication for the corresponding user or not based on the transmitted personal authentication result.

Hereinafter, the personal authentication procedure of FIG. 3 will be described. FIG. 3 illustrates a case where the user performs personal by using a mobile application 50 installed in the user mobile device 100. That is, FIG. 3 displays a procedure for a service that a person using the mobile application is the user himself/herself by using the IP address which the communication company allocates to the smart phone of the user, the SMS authentication value, and a Push ID which a mobile operating system providing company (that is, Google, Apple, etc.) allocates at the time of installing the smart phone application.

As a result, in the case of FIG. 3, even a user application may be confirmed in addition to user's own confirmation and user smart phone possession confirmation. During describing FIG. 3, a duplicated description of a part which may be applied in the same manner and similarly to FIG. 2 will be omitted (this is also applied even to FIGS. 4 and 5).

Referring to the personal authentication procedure of FIG. 3, as the user inputs the user information through the mobile application 50, the user information and the Push ID of the corresponding mobile application 50 are transmitted from the mobile application 50 to the personal authentication service server 200 [see S31 of FIG. 3]. As a result, the personal authentication service server 200 transfers the received user information and Push ID to the communication company server 300 [see S32 of FIG. 3].

Further, the personal authentication service server 200 requests the mobile application 50 to input the SMS authentication value [see S33 of FIG. 3] and the communication company server 300 generates the SMS authentication value and a push authentication value [see S34 of FIG. 3]. Herein, both the SMS authentication value and the push authentication value may be constituted by predetermined variable values. Thereafter, the communication company server 300 transmits the generated SMS authentication value to the phone number corresponding to the corresponding user information through the SMS message and transmits the generated push authentication value to the mobile application 50 corresponding to the corresponding push ID through the push message [see S35 of FIG. 3].

As the user inputs the SMS authentication value and the push authentication value transmitted according to S35 of FIG. 3 through the mobile application, the input SMS authentication value and push authentication value are transmitted to the personal authentication service server 200 [see S36 of FIG. 3]. In some cases, when the service is constituted by the mobile application, the SMS message and the push message which are input into the smart phone may be automatically received and transmitted to the personal authentication service server 200.

When the personal authentication service server 200 receives the SMS authentication value and the push authentication value, the personal authentication service server 200 transmits the received authentication values and the access information (the public or/and private IP address as described in the example) of the user mobile device to the communication company server 300 [see S38 of FIG. 3]. To this end, the personal authentication service server 200 confirms the IP address of the user mobile device which accesses the service [see S37 of FIG. 3]. Since the method for determining the access information of the connected client has been described above, the duplicated description will be omitted.

When the SMS authentication value, the push authentication value, and the IP address of the mobile device are transferred, the communication company server 300 performs the personal authentication confirmation according to S39 of FIG. 3. This may be performed by the following method. First, it is compared whether the user information transferred in S312 of FIG. 3 and the member information of the communication company member DB coincide with each other, second, it is compared whether the SMS authentication value (that is, the SMS authentication value input by the user) transferred according to S18 of FIG. 3 and the SMS authentication value (that is, the SMS authentication value) generated according to S34 of FIG. 3 coincide with each other, third, it is compared whether the IP address of the mobile device transferred according to S38 of FIG. 2 and the IP address of the mobile device which the communication company confirms in itself (that is, the communication company allocates to the corresponding mobile device) coincide with each other to perform the personal authentication confirmation, and fourth, it is compared whether the push authentication value transferred according to S38 of FIG. 3 and the push authentication value (that is, the push authentication value which is transmitted to the user according to S35 of FIG. 3) generated according to S34 of FIG. 34 coincide with each other to perform the personal authentication confirmation.

When the personal authentication confirmation process is completed, the communication company server 300 transmits the personal authentication result (that is, success or failure) to the personal authentication service server 200 [see S340 of FIG. 3]. The personal authentication service server 200 determines the personal authentication for the corresponding user or not based on the transmitted personal authentication result.

According to another embodiment, the personal authentication procedure of FIG. 3 may be normally executed only in a communication environment described below. For example, the mobile application 50 checks a communication state of the user mobile device 100 to execute the personal authentication procedure only when a communication network is a 3G/LTE network. As one of a hacking method, the hacker within a range in which short-range wireless communication is available, such as Wi-Fi, etc. may take the user information, and as a result, a scheme that permits access and authentication attempts through a short-range wireless communication network such as the 3G/LTE network etc., may be introduced in order to block such a hacking attempt.

According to yet another embodiment, the following procedures may be further added in addition to the personal authentication procedure described through FIG. 3.

In the case of FIG. 3 described above, the case where the mobile application 50 is installed in the user mobile device 100 is primarily described, but various cases may exist. For example, the mobile application 50 is an authentication mobile application and there is a case where a terminal (hereinafter, this is referred to as an authentication terminal) in which the authentication mobile application is installed and a terminal (hereinafter, this is referred to as an access terminal) which accesses the service separately exist may also exist.

In such a case, there may be a limit to normally permit the personal authentication procedure only when mutual locations are within a pre-designated range (that is, only when the access terminal and the authentication terminal are positioned adjacent to each other within a predetermined range) by comparing locations of the access terminal that accesses the corresponding service and the authentication terminal used by the corresponding user with each other.

In this case, the location of the access terminal is may be acquired based on the confirmed access IP address value and the location of the authentication terminal may be acquired based on GPS information of the corresponding terminal. Of course, the location of the access terminal may also be acquired based on the GPS information of the corresponding terminal. By such a method, a difference between the locations of the access terminal and the authentication terminal is calculated and only when the location difference is not large, the personal authentication procedure may be normally permitted. The reason is that since the user who possesses the authentication terminal commonly attempts accessing the service by using the access terminal, the service access attempt through the access terminal which is far from the authentication terminal is regarded as the access attempt by the hacker in most cases.

Hereinafter, the personal authentication procedure of FIG. 4 will be described. However, in the personal authentication procedure of FIG. 4, S51, S52, S53, S55, S56, S57, S58, S59, and S60 are steps of contents substantially the same as those in FIG. 2 described above. Therefore, hereinafter, only different matters from those in FIG. 2 will be described.

In the case of FIG. 4, in a process of generating the SMS authentication value through S54, the IP address of the user mobile device 100 is used. To this end, according to S53-2 of FIG. 4, the IP address of the user mobile device 100 to be used for generating the SMS authentication value is confirmed. That is, FIG. 4 is different from FIG. 2 described above in that the IP address (the entirety or a part of the IP address) which the communication company allocates to the mobile device 100 of the corresponding user is used as an authentication generation variable.

Hereinafter, the personal authentication procedure of FIG. 5 will be described. However, even in the personal authentication procedure of FIG. 5, S71, S73, S74, S75, S76, S77, S78, S79, and S80 are steps of contents substantially the same as those in FIG. 4 described above. Therefore, hereinafter, only different matters from those in the above drawings will be described.

In the case of FIG. 5, when the personal authentication service server 200 transmits the user information to the communication company server 300 through S72-2, it is characterized in that the personal authentication service server 200 transmits even the IP address of the user mobile device 100 in addition to the user information. To this end, the personal authentication service server 200 performs a process of previously confirms the IP address of the user mobile device 100 in a first half (see S72 of FIG. 5) of the entire procedure.

In FIGS. 6 to 10, a 'mobile authenticator 40' may be a separate authentication mobile device that performs service authentication or/and user authentication or an agent program or mobile application that acts as an authentication function. Further, in FIGS. 6 to 10, it is illustrated that the 'mobile authenticator 40' is a device that is separated from a 'user terminal 10', but the present invention need not particularly be the case. If the 'user terminal 10' is a terminal used by a real user, the user terminal 10 may also serve as the mobile authenticator. For example, the mobile authentication application or a widget type program which executes such a function may be installed in the user terminal and the mobile authentication application constituted by a separate window layer may be configured on one service application according to a scheme provided by a mobile OS. Further, in FIGS. 6 to 10, it is assumed that an 'online service server 20' and an 'authentication server 30' are separately provided, but the online service server 20 may serve as the authentication server.

Further, it is clarified that reference numerals (that is, S111, S112, S113, etc.,) associated with respective steps in authentication procedures of FIGS. 6 to 10 to be described below are just used for distinguishing describing the respective steps and do not define a procedural order. Logically, if other steps may be executed only after any one step is executed, the respective steps may be executed in parallel or simultaneously regardless of the order of the reference numerals, of course. In some cases, it is apparent that the respective steps may be executed in an order different from the order of the reference numerals. Only when a core technical feature of the present invention may be sufficiently reflected, the order of the respective steps may also be variously modified. However, hereinafter, for intensive and easy description, the respective steps will be described according to the order illustrated in the drawing. However, hereinafter, embodiments of the present invention will be described in detail with reference to the accompanying drawings.

FIG. 6 is a diagram illustrating a flow of a user centered service authentication technology according to an embodiment of the present invention and FIG. 7 is a diagram illustrating an embodiment regarding service centered user authentication in the related art and an embodiment regarding user centered service authentication according to the embodiment of the present invention.

The user-centered service authentication technology according to the embodiment of the present invention relates to a method and a system that authenticate the service based on the user without memorizing or inputting by the user by not verifying the user password based on the service but verifying the service password based on the service by the online service server while the user uses the online service.

In more detail, provided is a service authentication technology in which the service first presents the service password on the screen of the user terminal and determines whether the service password presented at that time and the service password displayed in the mobile authenticator coincide with each other and when a verification value according to coincidence between both service passwords is transferred from the mobile authenticator, the service is provided to the user terminal. Hereinafter, this will be described in detail with reference to FIGS. 6 and 7.

Referring to FIG. 6, the user inputs the user ID into the terminal 10 in which the user intends to use the online service [see S111 of FIG. 6].

According to the related art, the user which intends to use a specific online service inputs the user ID and the user password into an input form displayed on the screen of the terminal thereof and selects a log-in button to request user authentication for using the service as illustrated in FIG. 7(A). Unlike this, in the user centered service authentication technology according to the embodiment of the present invention, the user inputs only the user ID thereof into an upper ID input window (see reference numeral 13) in the input form (see reference numeral 12) shown on a right screen of FIG. 7(B).

With the input of the user ID, the user terminal 10 transmits the user ID input into the online service server 20 in which the user intends to use the service [see S112 of FIG. 6]. For example, when an event occurs, in which the user inputs an ID character string or an enter key into the ID input window or a cursor moves to the outside of the ID input window after inputting the ID character string, the user terminal 10 may transmit the input user ID to the online service server 20.

The online service server 20 that receives the user ID confirms whether the corresponding ID is a registered ID which subscribes in the service [see S113 of FIG. 6] and when it is determined the corresponding ID is the subscribed ID, the online service server 20 requests the service password to the authentication server 30 [see S114 of FIG. 6]. Herein, the service password means a password for confirming whether the service accessed by the user is a service by a real service subject providing the corresponding service. Simultaneously, the service password is used even for determining whether the user that accesses the service is not the hacker or the malicious user but the real user. In some cases, in a service password request process of S114 of FIG. 6, the user ID may also be transmitted to the authentication server 30.

In this case, S113 of FIG. 6 described above may be modified as described below. When the corresponding service is implemented to select any one of a common authentication procedure (an authentication procedure of requesting inputting the user ID and the user password) and the user centered service authentication procedure according to the embodiment of the present invention according to selection of the user, a procedure of confirming whether the corresponding user is a user which additionally subscribes in the user center service authentication scheme in addition to a procedure of confirming whether the user ID is the registered ID in S113 of FIG. 6. When the corresponding user is determined as a user which does not subscribes in the user centered service authentication scheme, the online service server 20 may display the input form for common user authentication illustrated in FIG. 7(A) on the screen of the user terminal 10 and display the cursor in the user password input window. However, hereinafter, for convenience and concentration of the description, the description is made by assuming that the corresponding user is the user which subscribes in the user centered service authentication scheme according to the embodiment of the present invention.

According to the service password request from the online service server 20, the authentication server 30 generates the service password [see S115 of FIG. 6]. In this case, a the service password, a predetermined random value, a random number value, a one time password (OTP), and the like may be used and the generation scheme is not also particularly limited, of course. Further, in some cases, the service password may be generated by using specific information corresponding to the corresponding user ID as a seed value for generating the password and in a process of generating the service password, a time, the number of attempt times, and the like may be additionally used as a password generation condition. This may be hereinafter applied even to various password values to be described below in the same manner or similarly.

The authentication server 30 may transfer the generated service password to the mobile authenticator 40 which is previously registered to correspond to the corresponding user ID [see S116 of FIG. 6]. In this case, when the mobile authenticator 40 is the authentication application, the corresponding service password may be transferred to the authentication application with the push message based on the push ID of the corresponding authentication application. As another example, the service password may be transferred by a scheme using an ARS or the SMS. Further, in some cases, a password condition value to be described below may also be additionally transferred to the mobile authenticator 40.

In addition, the authentication server 30 may transmit the generated service password to the online service server 20. In this case, the authentication server 30 may transmit even the password condition value to the online service server 20 together with the service password [see S117 of FIG. 6]. Herein, the password condition value may represent a maximum valid time (e.g., 1 minute, etc.) to approve whether the service password coincide with each other or whether a cancel button which will be displayed at a lower end of a log-in window is displayed so as to cancel the generated service password (see the input form of reference numeral 12 of FIG. 7(B)).

The online service server 20 transmits the corresponding information to the user terminal 10 [see S118 of FIG. 6] and the user terminal 10 allows the received service password or/and password condition to be displayed on the terminal screen [see S119 of FIG. 6]. In this case, an example of the screen displayed in the user terminal 10 according to S119 of FIG. 6 is illustrated through reference numeral 14 in the input form of reference numeral 12 of FIG. 7(B).

After the service password or/and password condition is/are displayed on the screen of the user terminal 10 as described above, a periodic confirmation process regarding whether the service authentication is completed may be added [see S120 of FIG. 6]. That is, the user terminal 10 may periodically confirm whether the verification value of the service password reaches the online service and the service is thus authenticated. Of course, in this case, it is apparent that the online service server 20 may also be configured to first give notification to the user terminal 10 according to a technical implementation scheme.

Further, when the service password is transferred to the mobile authenticator 40 according to S116 of FIG. 6 given above, the mobile authenticator 40 may display the received service password on the terminal screen or the application screen [see S121 of FIG. 6]. In this case, the example of displaying the service password to the mobile authenticator 40 is illustrated through reference numeral 44 of a left screen of FIG. 7(B).

Referring to a service password display window of reference numerals 14 and 44 of FIG. 7(B), it can be seen that both sides are displayed in the service password and a verification valid time of the corresponding service password is displayed in the service password display window in a time lapse bar shape as the password condition. That is, the lapse of the verification time or a residual valid time is displayed in the service password display window as a display condition of the service password together with the service password, and as a result, the user may visually confirm the valid time of the corresponding service password. As such, the service password is automatically in the service password display window according to the configuration and a service password verification valid time may be together displayed according to the service password condition or the display of the service password may be cancelled regardless of the time. Further, it is apparent that the service password condition may be applied and configured as not a separately transmitted variable but in the service password display window in a fixed shape in advance according to the configuration.

As described above, when the valid time of the corresponding service password elapses, S115, S116, S117, S118, S119, and S121 of FIG. 6 described above may be reperformed and the updated service password may be again displayed on each screen. In this case, visual display of the verification valid time is also updated.

Further, in FIG. 7, a case where the user ID and the service password are simultaneously displayed on one screen is illustrated, but it is apparent that a user ID input screen and a service password display screen may be configured in different screens.

As described above, when the service password is displayed through the screen of the mobile authenticator 40, the user may confirm whether the service password (see reference numeral 44 of FIG. 7(B)) displayed on the screen of the mobile authenticator 40 and the service password (see reference numeral 14 of FIG. 7(B)) displayed on the screen of the user terminal 10 coincide with each other. When two service passwords coincide with each other, the user may confirm that the service accessed thereby is the service by the real service subject. As a result, when the user inputs the agreement for the corresponding service, the mobile authenticator 40 transmits the service password verification value to the authentication server 30 [see S122 of FIG. 6].

Herein, the following method may be used for the user's agreement for the corresponding service. As one example, a scheme that selects a log-in button 45 at a lower end of a left diagram of FIG. 7(B) may be used. As another example, when the service password is transferred with the push message according to step S116 of FIG. 6, a scheme that makes an agreement may be used as a response to the push message. As yet another example, when the user makes an agreement after the service password is heard by voice by using the ARS, it is apparent that the user may be allowed to press #button and whether the user make an agreement may be replied through a text by using the SMS or a specific address included in the SMS is clicked to ask for the agreement. Only the log-in button 45 for the user's agreement is displayed at the lower end of the left diagram of FIG. 7(B), it is apparent that the cancel button is further displayed.

Further, herein, the service password verification value transferred to the authentication server 30 through S122 of FIG. 6 may be the same value as the service password received by the mobile authenticator 40, but in some cases, a value different from the received service password may be used or added. For example, as the service password verification value, a data interworking OTP value using a public key based transaction non-repudiation technique or the OTP may be used or further added so as to verify that the corresponding value is transmitted from the mobile authenticator 40 of the user. However, hereinafter, for convenience and concentration of the description, the description will be made by using assuming that the service password verification value which is the same as the service password is transmitted to the authentication server 30.

Through the aforementioned process, when the service verification value which coincides with the service password is received [see S123 FIG. of 6], the authentication server 30 transmits an authentication result for notifying authentication success to the online service server 20 [see S124 of FIG. 6], and as a result, the online service server 20 permits the service to be used through the corresponding user terminal 10 [see S125 of FIG. 6]. As confirmed through the above procedures, by the user centered service authentication technology according to the embodiment of the present invention, it may be confirmed that the corresponding service is the service by the real service subject and simultaneously, it may be confirmed whether the corresponding user is the real user through a process in which the verification value based on the corresponding service password is transferred from the previously registered mobile authenticator 40 to the authentication server 30, and as a result, the user authentication and the service authentication may be together processed by a very convenient method.

FIGS. 9 and 10 are diagrams for describing an access blocking technology of a malicious user according to another embodiment of the present invention. The access blocking technology of the malicious user according to the embodiment of the present invention relates to a method and a system that block a malicious attack in a system that authenticates that the corresponding user is the user himself/herself by using the user ID and the mobile terminal of the user without the user password.

In more detail, provided is a technology that in order to make use of the online service in which the user ID and the mobile authenticator substitute for the user authentication, when the a normal user ID is input into the service by the hacker, access determination request information to approve, cancel, close, and block the corresponding service access is transferred to the mobile authenticator and when the user selects an access blocking command within a given time, the access to the corresponding ID is blocked in the corresponding service according to a previously designated condition and even though the user approves the access within the given time, the corresponding authenticator may close the access again within a previously designated time. Hereinafter, this will be described in detail with reference to FIGS. 9 and 10. In a description process given below, the description of a part which may be duplicated with the aforementioned contents will be omitted.

FIG. 9 is a diagram of authenticating an user and thereafter, canceling service access of the corresponding user in a system that authenticates the user by using the ID and the mobile device of the user without a service password of the user.

Referring to FIG. 9, when the user inputs the ID after accessing the service by using the terminal 10 [see S131 of FIG. 9], the user terminal 10 transmits the input user ID to the online service server 20 [see S132 of FIG. 9]. The online service server 20 confirms whether the received user ID is the subscribed (registered) ID [see S133 of FIG. 9] and when the received user ID is the registered ID, the online service server 20 requests the authentication server 30 to authenticate the corresponding user ID [see S134 of FIG. 9]. In this case, in S134 of FIG. 9, the online service server 20 may transmit user information, terminal information, server information, and the like required for authentication to the authentication server 30 together.

Herein, the user information may be personal identification information including the ID of the user which accesses the service, the terminal information may be information which the online service server may automatically find through server variables including the IP address (public or private IP) of the terminal which accesses the service, a type and a version of a client which accesses the service, and the like, and the server information may be the IP address of the online service server and a session ID of the server, which is generated for access an access client requesting authentication. Further, all technologies that the online service server generates a predetermined unique value for communication with the client terminal in addition to the session ID which is automatically generated in order to cope with the client terminal according to the configuration will be collectively called the session ID.

According to the authentication request of the user ID, the authentication server 30 queries the push ID of the mobile application which interworks with the corresponding user ID (that is, previously registered with respect to the corresponding user ID) [see S135 of FIG. 9] and transfers an authentication request push message (that is, the push message including the authentication request value) to the mobile authenticator 40 by using the corresponding push ID [see S136 of FIG. 9].

In this case, the authentication request value may be at least one of various values which are transferred from the online service server 20 or previously registered in the authentication server 30, which includes an authentication request ID, the number of authentication request attempt times, a current time of the authentication request, a server IP address, a server session ID, the public IP address of the user terminal which accesses the service, the private IP address of the user terminal which accesses the service, a browser version of the user terminal which accesses the service, and the like.

With reception of the push message, the mobile authenticator 40 may drive the authentication application [see S137 of FIG. 9] and whether the user agrees to the access together with the aforementioned information depending on reception of the corresponding push message or information acquired by processing the information [see S138 of FIG. 9]. In this case, items to receive an input of access agreement or cancellation from the user within a designated time may be displayed on the authentication application screen.

When there is the access agreement input from the user [see S139 of FIG. 9], the mobile authenticator 40 generates an authentication agreement value and transmits the generated authentication agreement value to the authentication server 30 [see S140 of FIG. 9]. In this case, the authentication agreement value may be generated based on at least one of environment values (e.g., the IP address of the corresponding mobile device, a process ID, a device time, a time granted by the communication company, and the like) of the mobile authenticator 40 in which the mobile application is driven) and information received from the authentication server 30.

The authentication server 30 verifies whether the received authentication agreement value is transferred from a legitimate mobile authenticator 40 (alternatively, the authentication application) [see S141 of FIG. 9] and when the corresponding authentication value is received from the legitimate mobile authenticator 40, the authentication server 30 transfers an authentication success message to the online service server 20 [see S142 of FIG. 9].

In FIG. 9, a case where the authentication server 30 directly receives the authentication agreement value from the mobile authenticator 40 is illustrated, but it is apparent that the authentication agreement value may be transferred to the authentication server 30 via the online service server 20 or a third separate relay server.

With the reception of the authentication success message, the online service server 20 completes the user authentication associated with the corresponding user terminal 10 and starts the resulting service [see S143 of FIG. 9].

The process of S131 to S143 described above is substantially the same as that in the related art (see FIG. 8). However, as described above, the users often permit the service use by the malicious user because the password displayed in the mobile authenticator 40, and the like are not accurately confirmed or due to the immature operation and the mistake. Therefore, even after the service use by the malicious user is once permitted due to the mistake of the user, a method that may cancel the permission (that is, close the access) is required. To this end, the embodiment of the present invention proposes a method that may close the access of the malicious user according to S144 to S149 of FIG. 9.

According to the embodiment of the present invention, the user that recognizes that the service use of the malicious user is permitted (alternatively, recognizes the operation mistake of the user) may request closing (alternatively, canceling) the access to the corresponding service within a predetermined limited time according to the above steps. To this end, even after the access agreement is made, an access closing request button of the corresponding service may be activated on the application screen of the mobile authenticator 40 for a designated predetermined time [see S144 of FIG. 9].

In this case, the access closing may be limited by policy by enabling the access closing only within a time (e.g., 3 minutes after the access agreement or within a time in which the session ID is valid) which is designated in advance, and the like. In this case, when the designated time is exceeded, the application screen may be initialized or the authentication application may be terminated. Of course, a time limitation associated with the access closing request is not requisite.

As a result, when the user requests the access closing [see S145 of FIG. 9], the mobile authenticator 40 generates an access closing value and transmits the generated access closing value to the authentication server 30 [see S146 of FIG. 9]. In this case, the access closing value may be generated based on at least one of the environment values (e.g., the IP address of the corresponding mobile device, the process ID, the device time, the time granted by the communication company, and the like) of the mobile authenticator 40 in which the mobile application is driven) and information received from the authentication server 30.

When the access closing value is received, the authentication server 30 verifies whether the corresponding access closing value is transferred from the legitimate mobile authenticator 40 [see S147 of FIG. 9] and when the corresponding access closing value is received from the legitimate mobile authenticator 40, the authentication server 30 transmits the access closing request message to the online service server 20 [see S148 of FIG. 9]. As a result, the online service server 20 may close and process the existing service access [see S149 of FIG. 9].

FIG. 10 is a diagram illustrating the flow of blocking an attempt when a malicious user attempts authentication with the ID of the user in the system that authenticates the user by using the ID and the mobile device of the user without the service password of the user. Herein, since S151, S152, S153, S154, S155, S156, and S157 of FIG. 10 are substantially the same processes as those in FIG. 9 described above, the duplicated description thereof will be omitted.

FIG. 10 relates to a method for preventing, in the case where the malicious user attempts to access the service by using the user ID of other people by means of the terminal (see the user terminal 10 of FIG. 10), the attempt. That is, FIG. 10 illustrates the case where the push message including the authentication request value is transferred to the mobile authenticator 40 of the real user according to the authentication request for the service access of the malicious user.

When the authentication request value is received as described above, the mobile authenticator 40 displays the agreement, cancellation, and blocking of the user through the screen together with the aforementioned information depending on the reception of the corresponding push message and the information acquired by processing the information [see S158 of FIG. 9]. In this case, when the access blocking or canceling request is input within a limited time [see S159 of FIG. 9], the mobile authenticator 40 generates an access blocking value and transmits the generated blocking value to the authentication server 30 [see S160 of FIG. 9].

In this case, the access blocking value may also be generated based on at least one of the environment values (e.g., the IP address of the corresponding mobile device, the process ID, the device time, the time granted by the communication company, and the like) of the mobile authenticator 40 in which the mobile application is driven) and the information received from the authentication server 30.

When the access blocking value is received, the authentication server 30 verifies whether the corresponding access blocking value is transferred from the legitimate mobile authenticator 40 [see S161 of FIG. 9] and when the corresponding access blocking value is received from the legitimate mobile authenticator 40, the authentication server 30 transmits the access blocking request message to the online service server 20 [see S162 of FIG. 9]. As a result, the online service server 20 may block the access attempt by the malicious user [see S163 of FIG. 9] and guide the blocked access attempt to the corresponding user terminal 10 [see S164 of FIG. 9].

Further, according to a configuration scheme, when the online service server 20 or the authentication server 30 keeps and manages the user ID sent to be blocked, the blocked terminal IP address, a blocking time (a start time, a finishing time, etc.), and the valid time and the user terminal which accesses the service requests the authentication under the same condition, the online service server 20 or the authentication server 30 may block the user authentication request in itself. Further, in this case, the valid time is examined according to a previously designated period to update the corresponding blocking condition.

The authentication method according to the embodiments of the present invention may be implemented as a computer readable code in a computer readable recording medium. The computer readable recording medium includes all kinds of recording media storing data which may be deciphered by a computer system. For example, the recording media may include a read only memory (ROM), a random access memory (RAM), a magnetic tape, a magnetic disk, a flash memory, an optical data storage device, etc. Further, the computer readable recording media may be stored and executed as codes which may be distributed in the computer system connected through a computer communication network and read by a distribution method.

The present invention has been described with reference to the exemplary embodiments. However, it will be able to be easily appreciated by those skilled in the art that various modifications and changes of the present disclosure can be made without departing from the spirit and the scope of the present disclosure which are defined in the appended claims and their equivalents.

The invention claimed is:

1. An authentication system performing user-centered authentication, comprising:

an authentication server equipped with an authenticator agent component implemented as a software application for performing an authentication procedure of an online service server; and a mobile authenticator equipped with a mobile authentication agent component as a software application for performing an authentication procedure of an access terminal, wherein when a user ID is transferred from the online service server as an input of the user ID into a user ID input window on a service log-in screen that does not display a user password input window, the authentication server identifies the mobile authenticator corresponding to the user ID, generates a service authentication password value according to a service authentication password request from the online service server, and transmits the service authentication password value to the identified mobile authenticator and the online service server to be accessed by the access terminal, respectively, wherein the service authentication password value is a newly generated password value for verifying that the online service server to be accessed by the access terminal is authentic, wherein upon receiving the service authentication password value, the online service server displays the received service authentication password value on the service log-in screen, wherein upon receiving the service authentication password value, the mobile authenticator displays the received service authentication password value on a screen of the mobile authenticator, wherein the mobile authenticator is a mobile terminal of a user and is different form the access terminal, wherein when the service authentication password value displayed on the service log-in screen matches the service authentication password value displayed on the screen of the mobile authenticator, the mobile authenticator generates and transmits a service password verification value directly to the authentication server, wherein upon receiving the service password verification value, the authentication server transmits an authentication success message to the online service server to enable batch processing of both service authentication verifying authenticity of the online service server and user authentication verifying identity of the user requesting access through the access terminal, wherein the authentication server is separate from the online service server, wherein the service authentication password value is generated using server information comprising an IP address or a session ID of the online service server.

2. The authentication system of claim 1, wherein a service authentication password display window is included in the service log-in screen, the online service server displays the service authentication password value in the service authentication password display window and displays a graphical indicator showing remaining validity time for the service authentication password value, and the mobile authenticator displays a service authentication password display window having a same graphical user interface as the service authentication password display window displayed on the service log-in screen, including both the service authentication password value and the graphical indicator showing the remaining validity time.

3. The authentication system of claim 2, wherein the service authentication password value is displayed in the service authentication password display window by a number string or a character string and the password valid time is displayed in the service authentication password display window in a time lapse bar shape to visually guide the lapse of a password valid time.

4. The authentication system of claim 3, wherein the authentication server updates and generates the service authentication password value with the lapse of the password valid time and retransmits the updated and generated service authentication password value to the online service server and the mobile authenticator, and the service authentication password value and the password valid time are updated and displayed in the service authentication password window with the update of the service authentication password value.

5. The authentication system of claim 1, wherein after service access is permitted to the online service server in association with the access terminal with the transmission of the authentication success message, when an access closing value is received from the mobile authenticator to the authentication server, the authentication server confirms whether a transmission subject of the access closing value is the registered mobile authenticator corresponding to a service user and transmits an access closing request message to the online service server when it is confirmed that the access closing value is received from the registered mobile authenticator.

6. The authentication system of claim 1, wherein when an access blocking value is received from the mobile authenticator receiving the service authentication password value to the authentication server, the authentication server confirms whether the transmission subject of the access blocking value is the registered mobile authenticator corresponding to the service user and transmits an access blocking request message to the online service server when it is confirmed that the access blocking value is received from the registered mobile authenticator.

7. The authentication system of claim 6, wherein the authentication server keeps related information regarding the access terminal in which the access is blocked and automatically blocks an authentication request when the authentication request of the same condition is reattempted from the access terminal in which the access is blocked.

* * * * *